United States Patent
Cortaire Apesteguia

(10) Patent No.: US 12,234,809 B2
(45) Date of Patent: Feb. 25, 2025

(54) WIND TURBINE COOLING SYSTEM AND TESTING METHOD THEREOF

(71) Applicant: Siemens Gamesa Renewable Energy Innovation & Technology S.L., Sarriguren (ES)

(72) Inventor: Jorge Cortaire Apesteguia, Sarriguren (ES)

(73) Assignee: SIEMENS GAMESA RENEWABLE ENERGY INNOVATION & TECHNOLOGY S.L., Sarriguren (ES)

(*) Notice: Subject to any disclaimer, the term of this patent is extended or adjusted under 35 U.S.C. 154(b) by 69 days.

(21) Appl. No.: 18/010,051

(22) PCT Filed: May 10, 2021

(86) PCT No.: PCT/EP2021/062261
§ 371 (c)(1),
(2) Date: Dec. 13, 2022

(87) PCT Pub. No.: WO2021/259546
PCT Pub. Date: Dec. 30, 2021

(65) Prior Publication Data
US 2023/0228252 A1    Jul. 20, 2023

(30) Foreign Application Priority Data
Jun. 25, 2020 (EP) .................... 20382559

(51) Int. Cl.
*F03D 80/60*    (2016.01)
*F03D 13/40*    (2016.01)

(52) U.S. Cl.
CPC ............ *F03D 80/60* (2016.05); *F03D 13/40* (2016.05); *F05B 2240/14* (2013.01);
(Continued)

(58) Field of Classification Search
CPC .......... F03D 80/60; F03D 13/30; F03D 13/40; F03D 13/401; F03D 13/402; F03D 13/403; F05B 2240/14
See application file for complete search history.

(56) References Cited

U.S. PATENT DOCUMENTS

| | | | |
|---|---|---|---|
| 2011/0123335 A1* | 5/2011 | Munk-Hansen | ........ F03D 13/40 416/95 |
| 2014/0030111 A1* | 1/2014 | Kohne | .................. E06B 9/0638 416/244 R |

FOREIGN PATENT DOCUMENTS

| | | | |
|---|---|---|---|
| EP | 2 325 482 A1 | 5/2011 | |
| EP | 2 391 824 A2 | 12/2011 | |

(Continued)

OTHER PUBLICATIONS

English Translation of EP 2431608 (Year: 2011).*
International Search Report & Written Opinion for PCT/EP2021/062261, mailed on Jun. 17, 2021.

*Primary Examiner* — Sean Gugger
(74) *Attorney, Agent, or Firm* — Schmeiser, Olsen & Watts LLP

(57) ABSTRACT

A wind turbine cooling system, a wind turbine with the cooling system, and a method for testing the cooling system are provided. The cooling system includes a radiator assembly and a nacelle. The nacelle includes a housing rotatably connected with the radiator assembly. The cooling system is configured to thermally couple the radiator assembly to a heat source inside the nacelle. The radiator assembly is moveable between a first position and a second position. When in the first position, the radiator assembly extends away from an upper roof of the housing of the nacelle. When in the second position, the radiator assembly is contained inside the housing of the nacelle.

12 Claims, 6 Drawing Sheets

(52) U.S. Cl.
CPC ....... *F05B 2240/57* (2013.01); *F05B 2260/02* (2013.01); *F05B 2260/20* (2013.01); *F05B 2260/83* (2013.01)

(56) References Cited

FOREIGN PATENT DOCUMENTS

| | | |
|---|---|---|
| EP | 2 431 608 A2 | 3/2012 |
| EP | 3 636 917 A1 | 4/2020 |
| WO | 2010/085963 A2 | 8/2010 |

\* cited by examiner

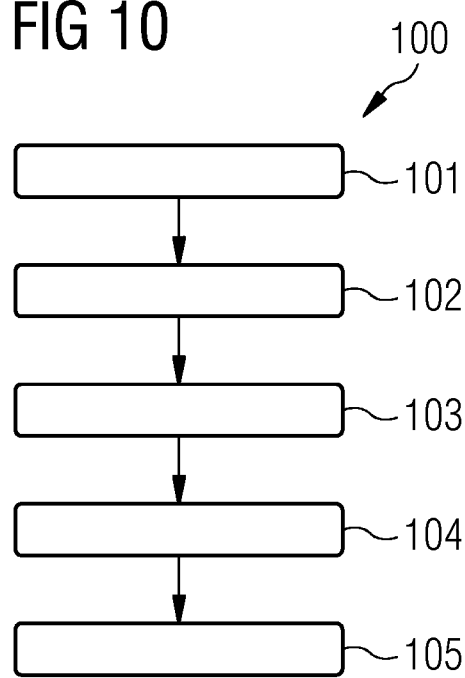

WIND TURBINE COOLING SYSTEM AND TESTING METHOD THEREOF

CROSS-REFERENCE TO RELATED APPLICATIONS

This application claims priority to PCT Application No. PCT/EP2021/062261, having a filing date of May 10, 2021, which claims priority to European Application No. 20382559.1, having a filing date of Jun. 25, 2020, the entire contents both of which are hereby incorporated by reference.

FIELD OF TECHNOLOGY

The following relate to a wind turbine cooling system, a wind turbine with the cooling system, and a method for testing the cooling system.

BACKGROUND

With the increase of the unit capacity of wind turbines, the heat produced by different components rise significantly. Effective cooling systems should be adopted to the heat generated by heat sources in the wind turbine.

A cooling system for a wind turbine conventionally comprises a radiator assembly located outside on the upper rear part of the nacelle of the wind turbine to radiate heat produced by different components of the wind turbine to the ambient air.

Locating the radiator assembly outside the nacelle is good for the performance of the radiator assembly as it can gain advantages from the natural airflow, but on the other hand, it creates logistics and transportation problems for transporting wind turbine components, especially nacelles with a radiator assembly. The radiator assembly can be bulky. For transportation on roads, it is necessary, to plan the route carefully, as a transport vehicle has to circumvent or has to cope with all barriers like curves, tunnels, bridges, traffic lights, etc. For example, there are strict normative that limit the total width and height of the wind turbines for road transportation. Usually, the total height of the radiator assembly and the nacelle overpasses the maximum height allowed by the normative, hence, conventionally, the radiator assembly and the nacelle has to be transported separately to the planned site. This can result in extra transportation. Additionally, the radiator assembly has to be reassembled at the site. The reassembling works include refilling and purging the cooling circuits, which will introduce extra assembly works at the deployment site.

SUMMARY

An aspect relates to advanced wind turbine cooling systems and methods to test wind turbine cooling systems.

A cooling system for a wind turbine comprises a radiator assembly and a nacelle. The nacelle comprises a housing rotatably connected with the radiator assembly. The cooling system is configured to thermally couple the radiator assembly to a heat source inside the nacelle. The radiator assembly is moveable between a first position and a second position. When in the first position, the radiator assembly extends away from an upper roof of the housing of the nacelle. When in the second position, the radiator assembly is contained inside the housing of the nacelle.

A wind turbine comprises a cooling system. The cooling system comprises a radiator assembly and a nacelle. The nacelle comprises a housing rotatably connected with the radiator assembly. The cooling system is configured to thermally couple the radiator assembly to a heat source inside the nacelle. The radiator assembly is moveable between a first position and a second position. When in the first position, the radiator assembly extends away from an upper roof of the housing of the nacelle. When in the second position, the radiator assembly is contained inside the housing of the nacelle.

A method for testing a cooling system of a wind turbine is provided. The cooling system comprises a nacelle of the wind turbine and a radiator assembly rotatably connected with a housing of the radiator assembly. The radiator assembly is thermally coupled to a heat source inside the nacelle and moveable between a first position and a second position. The method comprises installing the nacelle together with the radiator assembly in a nacelle assembly factory such that the radiator assembly is in the first position in which the radiator assembly extends away from the housing of the nacelle. The method also comprises performing a heat dissipation check of the cooling system when the radiator assembly is in the first position. The method further comprises moving the radiator assembly to the second position in which the radiator assembly is contained in the nacelle. The method also comprises transporting the nacelle containing the radiator assembly to a deployment site of the wind turbine when the radiator assembly is in the second position. The method further comprises, at the deployment site, moving the radiator assembly back to the first position.

It is to be understood that the features mentioned above and those yet to be explained below may be used not only in the respective combinations indicated, but also in other combinations or in isolation without departing from the scope of embodiments of the invention.

BRIEF DESCRIPTION

Some of the embodiments will be described in detail, with reference to the following figures, wherein like designations denote like members, wherein:

FIG. 1 schematically illustrates a wind turbine;

Figure 2:
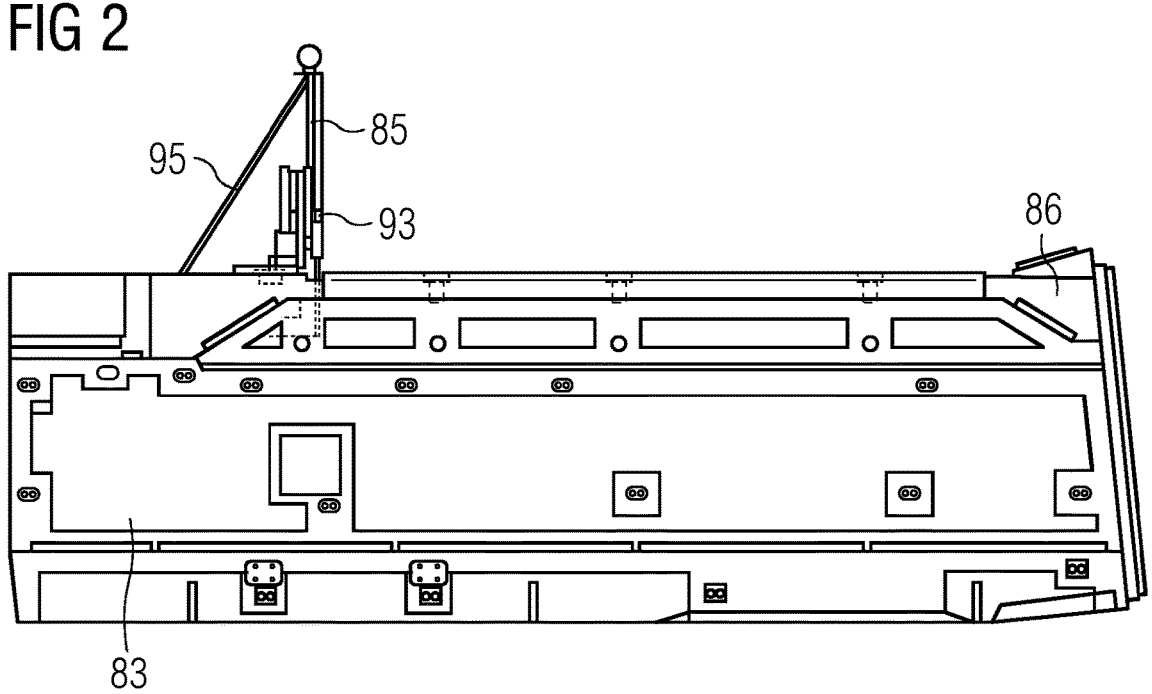
FIG. 2 is a side view of a cooling system for a wind turbine according to various examples.
Figure 3:
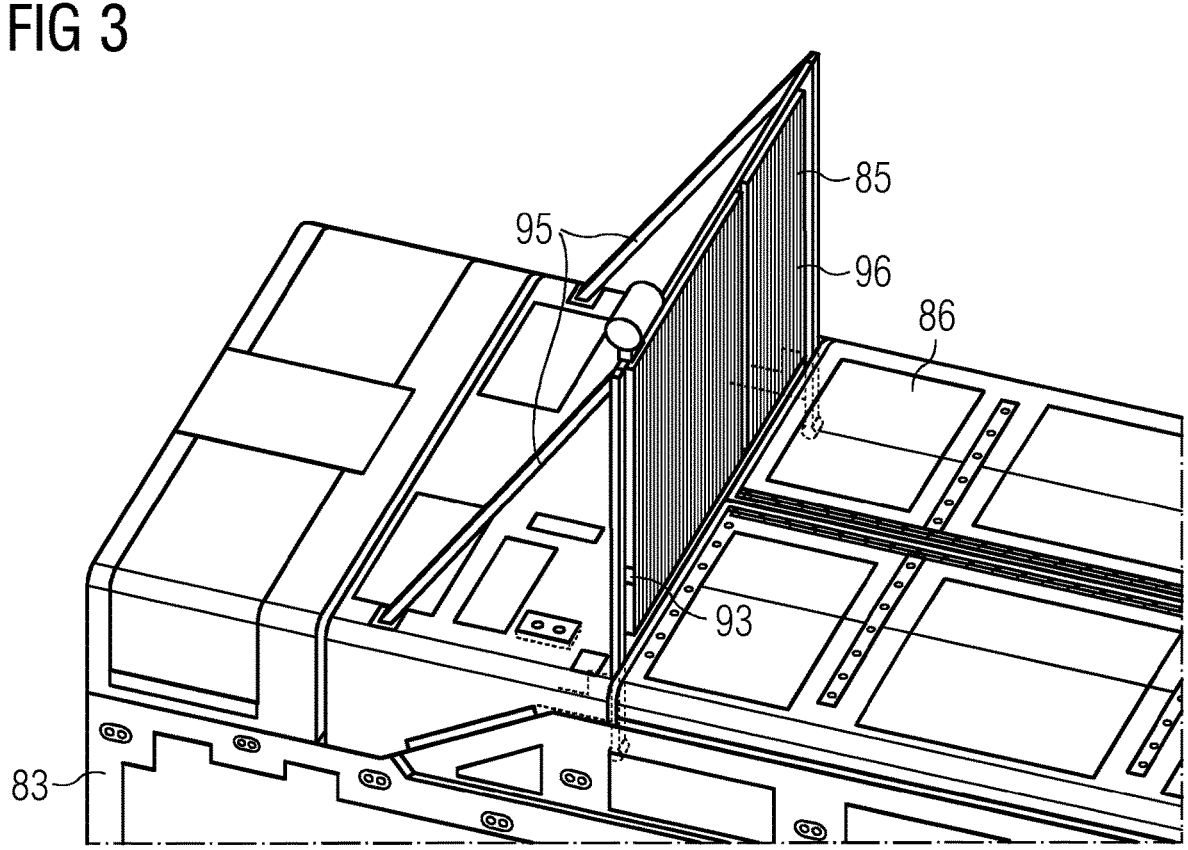
FIG. 3 is a perspective view of the cooling system of FIG. 2.
Figure 4:
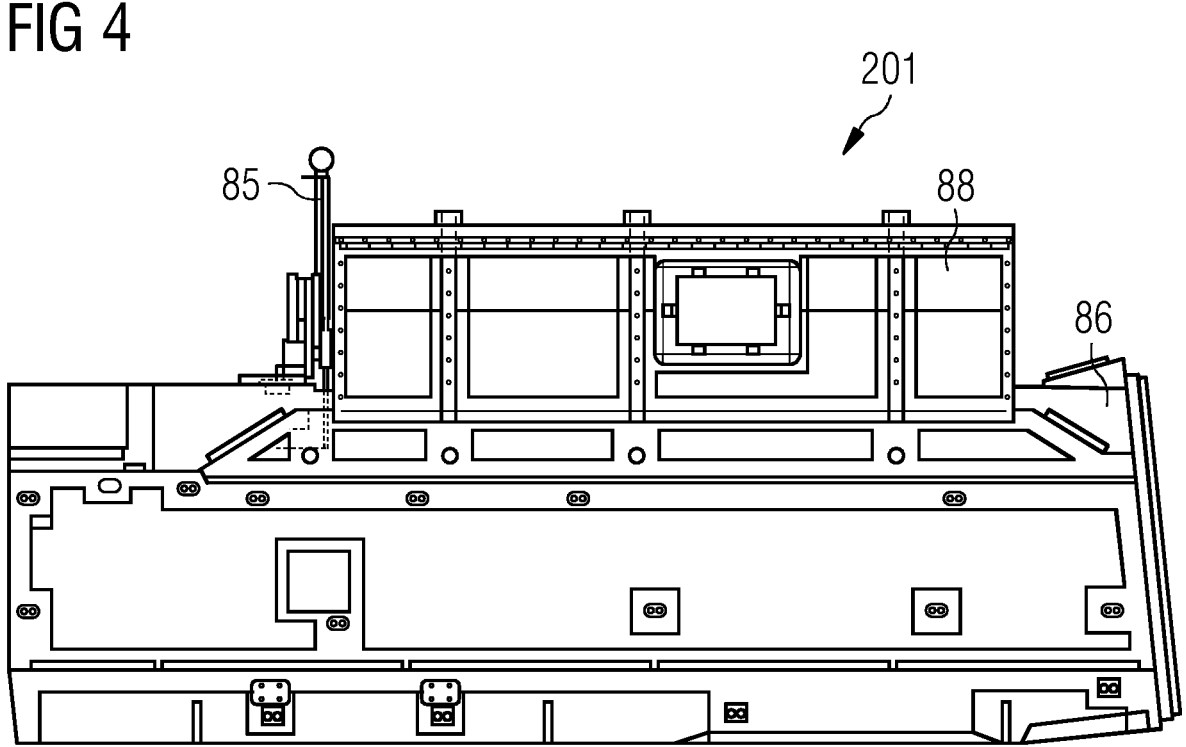
Figure 5:
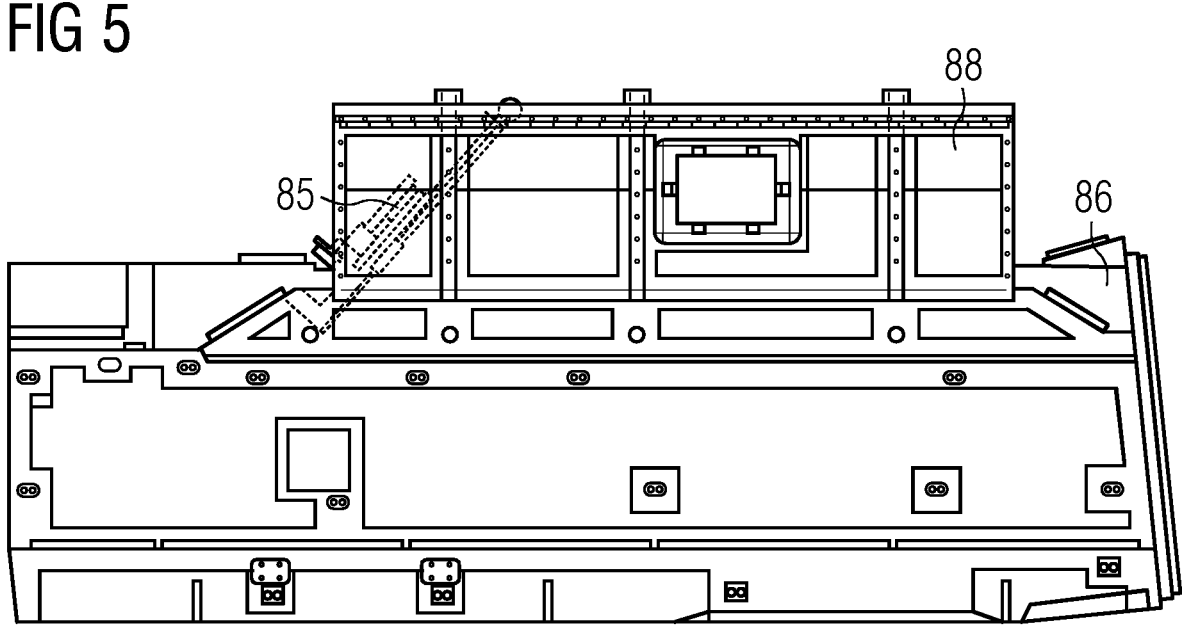
Figure 6:
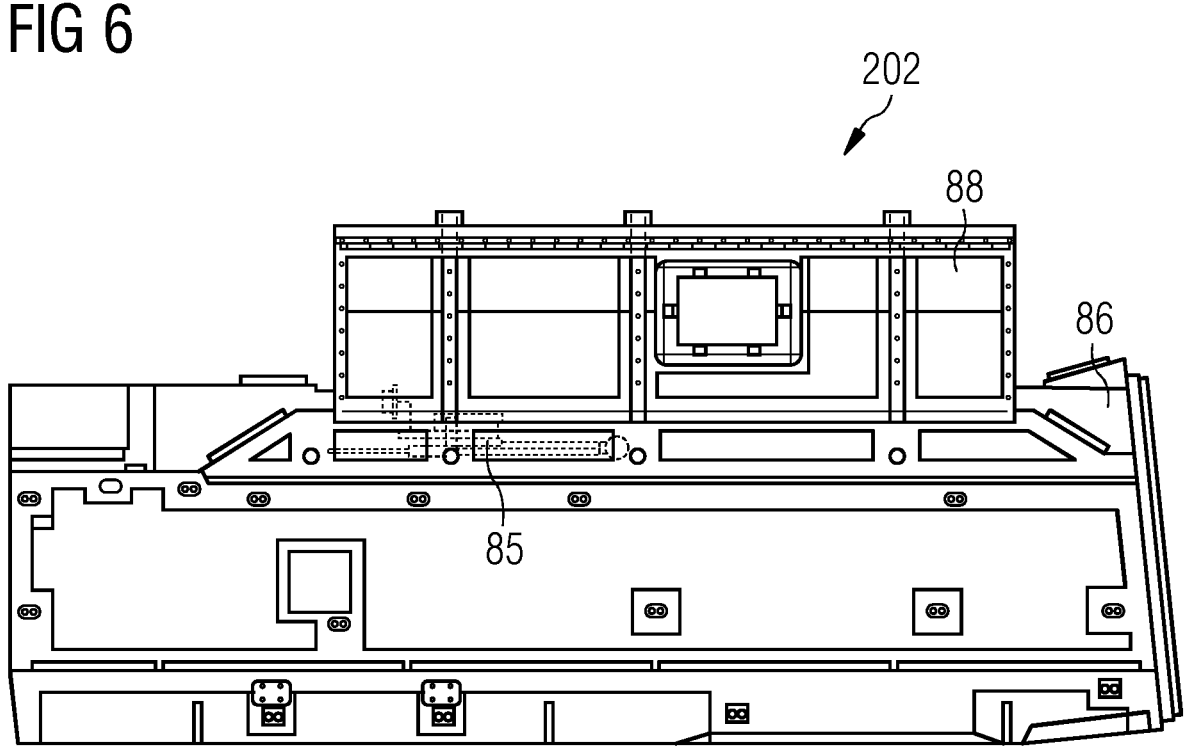
Figure 7:
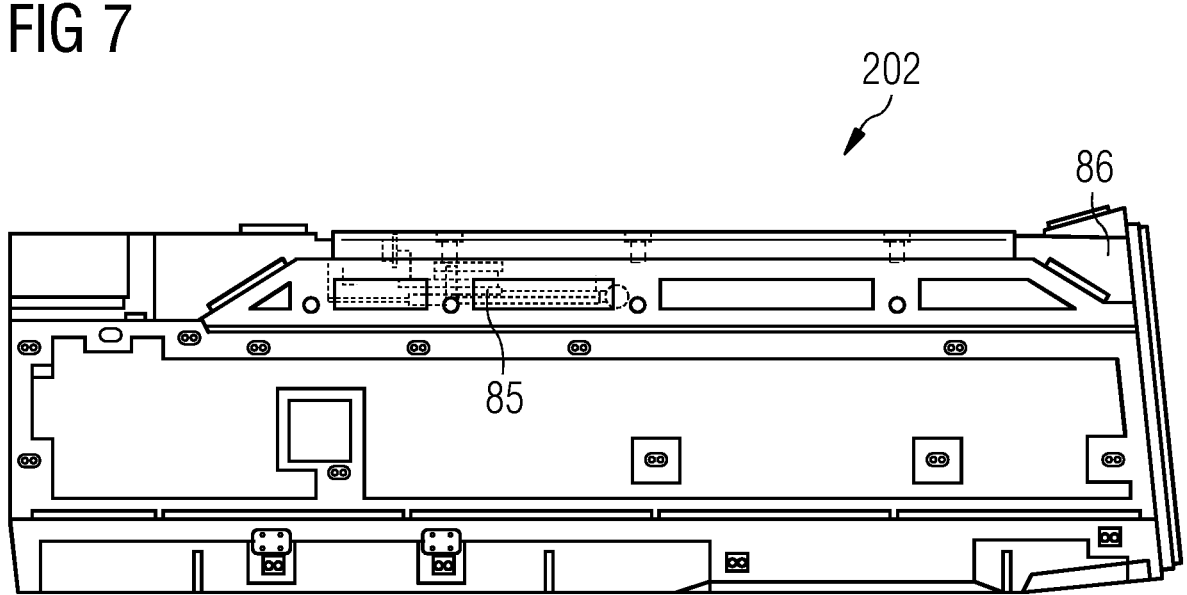
Figure 8:
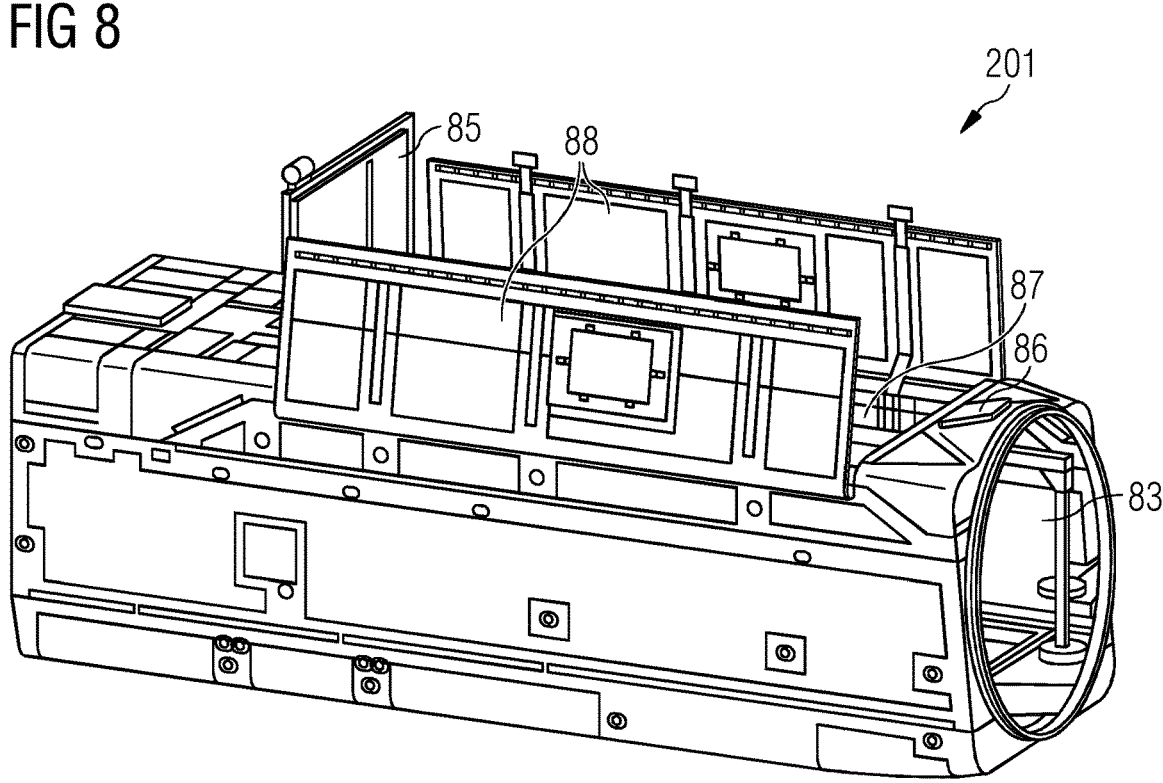
Figure 9:
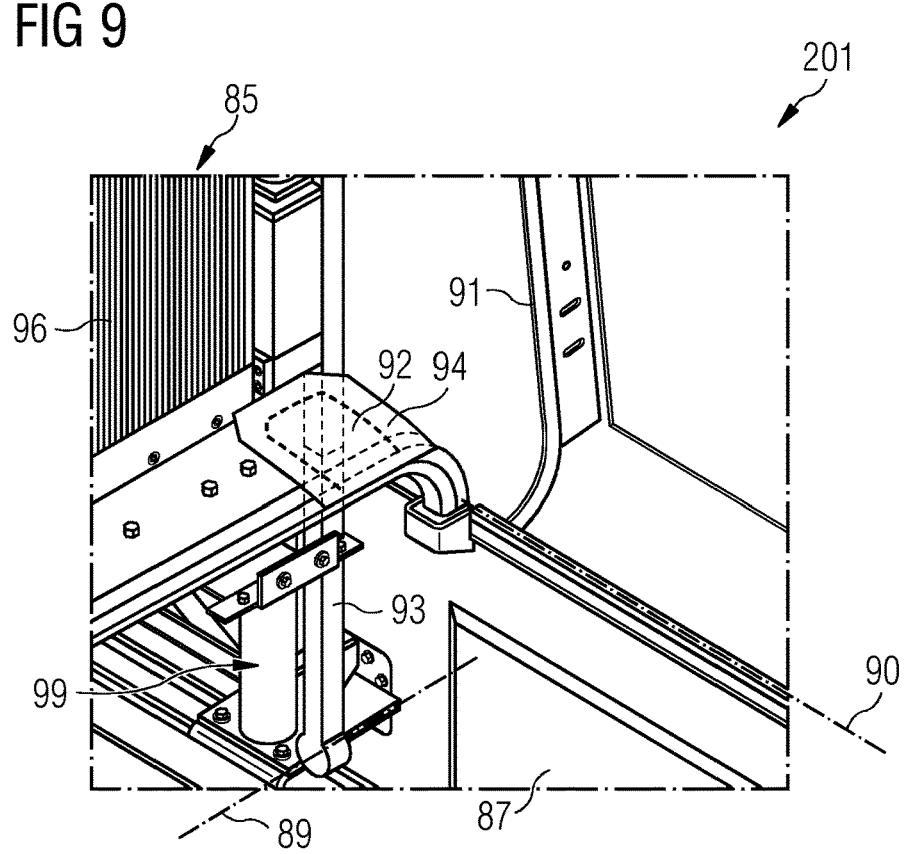

FIG. 4; schematically illustrates aspects with respect to a process of moving a radiator assembly of the cooling system of FIG. 2 or FIG. 3 from a first position to a second position;

FIG. 5 schematically illustrates aspects with respect to a process of moving a radiator assembly of the cooling system of FIG. 2 or FIG. 3 from a first position to a second position;

FIG. 6 schematically illustrates aspects with respect to a process of moving a radiator assembly of the cooling system of FIG. 2 or FIG. 3 from a first position to a second position;

FIG. 7 schematically illustrates aspects with respect to a process of moving a radiator assembly of the cooling system of FIG. 2 or FIG. 3 from a first position to a second position;

FIG. 8 is a perspective view of the cooling system of FIG. 2 to FIG. 7;

FIG. 9 schematically illustrates aspects with respect to a perspective view of a rotary connection mechanism of the cooling system for the wind turbine; and FIG. 10 is a flowchart of a method for testing a cooling system for a wind turbine.

DETAILED DESCRIPTION

In the following, embodiments of the invention will be described in detail with reference to the accompanying drawings. It is to be understood that the following description of embodiments is not to be taken in a limiting sense. The scope of embodiments of the invention is not intended to be limited by the embodiments described hereinafter or by the drawings, which are taken to be illustrative only.

The drawings are to be regarded as being schematic representations and elements illustrated in the drawings, which are not necessarily shown to scale. Rather, the various elements are represented such that their function and general purpose become apparent to a person skilled in the art. Any connection or coupling between devices, components, or other physical or functional units shown in the drawings or described herein may also be implemented by an indirect connection or coupling.

Various techniques described herein generally relate to cooling systems for wind turbines, more specifically, relate to cooling systems with a rotatable radiator assembly.

According to the various examples described herein, it is possible to fold and unfold a radiator assembly of the cooling system. The radiator assembly can be folded to hide-away an interior of a housing of a nacelle of the wind turbine, thereby reducing the outer dimensions facilitating transport on narrow roads.

Figure 1:
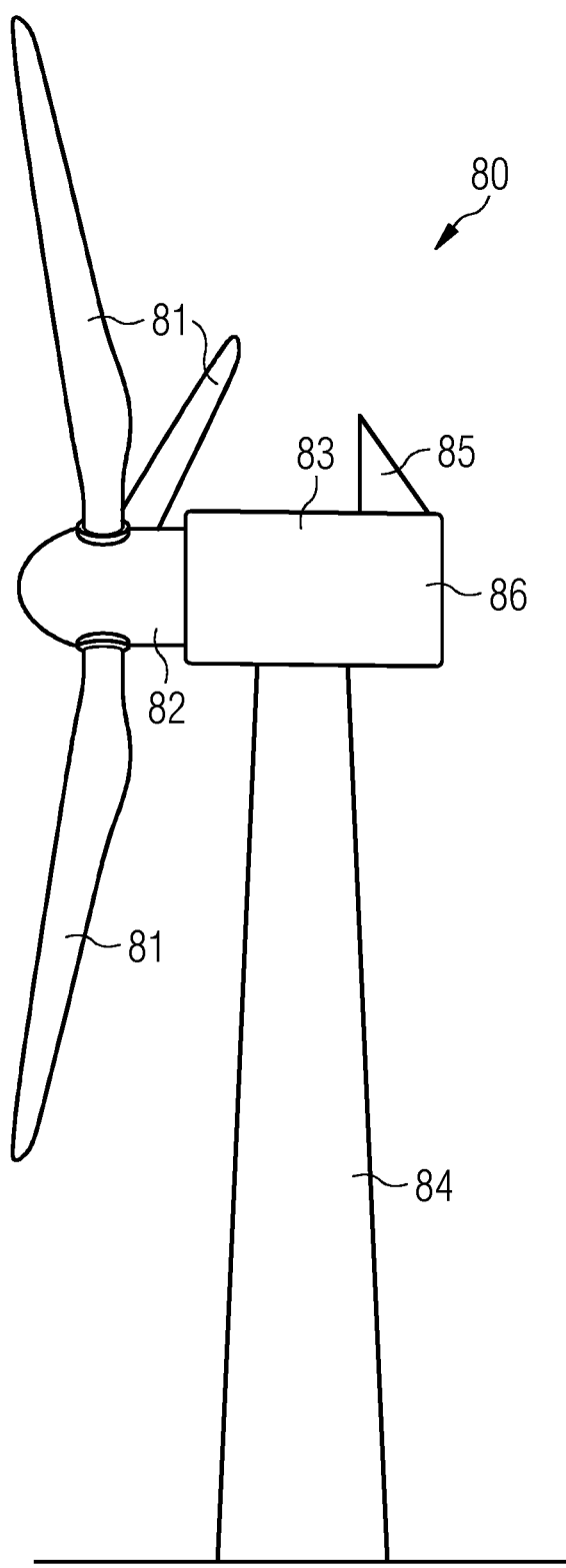

FIG. 1 schematically illustrates an exemplary wind turbine 80. The wind turbine 80 includes blades 81 attached to a hub 82. The hub 82 is connected to a nacelle 83, mounted on a tower 84. The nacelle 83 comprises a generator, coupled with the hub rotating along with the blades 81. This connection can be via a shaft and gear.

The nacelle 83 is a core component for a wind turbine and also the concentrated area of heat production in the operating process. One or more heat sources associated with the operation of the generator are arranged inside the nacelle 83. The nacelle 83 further comprises a gearbox that is the bridge connecting the blades 81 and the generator. The running gearbox causes some power loss, most of which transfers into heat and is absorbed by the lubricating oil and, thus, causes temperature rising in the gearbox. If the temperature becomes too high, it will lead to impairment of the gear meshing or the bearing surface and, eventually, an equipment accident. The gearbox, thus, acts as a heat source.

The generator rotor is connected to the high-speed shaft of the gearbox. It drives the generator to rotate at a high speed and to cut the magnetic lines of force, by which electric energy is obtained. During the operation of the wind turbine 80, the generator will produce a heat mainly in its windings and various internal wastes of iron core, primarily comprised of iron loss, copper loss, excitation loss and mechanical loss, which would lead to damage of the generator. Thus, these components of the generator also implement heat sources.

As the wind speed and direction are changing during operation of the wind turbine 80, a control system is typically installed in the nacelle 83 to adjust the operating status promptly to ensure the secure and stable operation of the wind turbine 80. Also, electrical and/or mechanical components of the control system can act as heat sources.

As has been mentioned above, during operation of wind turbine 80, the gearbox, generator and control system will produce heat. In order to ensure the secure and stable operation of the wind turbine 80, a radiator assembly can be thermally coupled to one or more such heat sources, to provide cooling to these heat sources. A respective cooling system comprises a radiator assembly 85 connected with a housing 86 of the nacelle 83. After deployment of the wind turbine 80, the radiator assembly 85 extends away from the upper roof of the housing 86 of the nacelle 83.

FIG. 2 and FIG. 3 schematically illustrate aspects with respect to a front view and a perspective view of the cooling system for the wind turbine 80, respectively.

The cooling system for the wind turbine 80 is formed by the radiator assembly 85 and the nacelle 83 comprising a housing 86. The housing 86 is rotatably connected with the radiator assembly 85. The cooling system is configured to thermally couple—e.g., using a heat transfer fluid piped along a fluid flow path—a heat exchange surface 96 of the radiator assembly 85 to at least a heat source inside the nacelle 83, such as, the gearbox, generator and control system, as mentioned above. The heat exchange surface 96 includes thermal fins that have a large surface to be engaged by environmental airflow.

The radiator assembly 85 can be moved between two positions with respect to the housing 86 of the nacelle 83, to thereby reduce the overall footprint which is helpful for transportation. In one of the two positions, the radiator assembly provides highest cooling power; in the other one of the two positions, the radiator assembly is contained inside the housing 86 of the nacelle 83. Details with respect to such movement of the radiator assembly 85 are illustrated in connection with FIG. 4 to FIG. 7.

FIG. 4 to FIG. 7 schematically illustrate aspects with respect to the process of moving the radiator assembly 85 from a first position 201 to a second position 202.

As shown in FIG. 4 to FIG. 7, the radiator assembly 85 is moveable between a first position 201 and a second position 202. FIG. 4 shows that the radiator assembly 85 is in the first position 201, i.e., the radiator assembly 85 extends away from the upper roof of the housing 86 of the nacelle 83. Additionally, FIG. 6 and FIG. 7 illustrate that the radiator assembly 85 is in the second position 202, i.e., the radiator assembly is contained inside the housing of the nacelle. Further, FIG. 5 depicts that the radiator assembly 85 is in an intermediate position between the first position 201 and the second position 202.

Before transporting the radiator assembly 85 together with the nacelle 83, the radiator assembly 85 needs to be moved from the first position 201 to the second position. On the other hand, the radiator assembly 85 need to be moved from the second position 202 to the first position 201 at a deployment site, e.g., a windfarm, a hill-top, etc.

FIG. 8 is another perspective view of the cooling system for the wind turbine 80. In particular, FIG. 8 illustrates aspects with respect to an opening 87 in the housing 86, wherein the opening 87 can be covered by moveable doors 88.

In some cases, the upper roof of the housing 86 of the wind turbine 80 comprises an opening 87 such that the radiator assembly 85 can be moved from the first position into the nacelle 83 via the opening 87, towards the second position. In addition, the upper roof of the housing 86 comprises at least one movable door 88 to open or close the opening 87 of the upper roof of the housing 86. Each of the at least one movable door 88 is rotatably connected with an edge of the opening 87.

While the moveable doors 88 are rotatably connected to the housing 86, in other examples, it would be possible to use a removable lid to cover the opening 87. I.e., the moveable doors 88 are optional.

In some implementations, each of the at least one movable door 88 comprises a sealing ring enfolding the edge of the movable door 88. The sealing ring can prevent heat exchange between the internal and the external of the nacelle 83, particularly when the external of the nacelle 83 is hotter than the internal of the nacelle 83.

Similarly, in some cases, the edge of the opening 87 may be enfolded by a further sealing ring to prohibit heat exchange between the internal and the external of the nacelle 83 as well.

In some cases, the at least one movable door 88 comprises two doors rotatably connected with two opposite edges of the opening 87, respectively. Alternatively, the at least one movable door 88 comprises one foldable door rotatably connected with an edge of the opening 87.

FIG. 9 is a perspective view showing details of a rotary connection mechanism of the cooling system for the wind turbine 80.

The radiator assembly 85 comprises at least one rotary connection mechanism 99. Each of the rotary connection mechanism 99 is configured to move the radiator assembly 85 between the first position and the second position by rotation around a rotation axis 89. The rotary connection mechanism comprises a hinge 98 to implement the rotation around the rotation axis 89. A support beam 93 extends from the hinge 98 towards radiator a heat exchange surface 96 of the radiator assembly 85 including cooling fins.

In some implementations, the radiator assembly 85 comprises two rotary connection mechanisms symmetrically located at two opposite sides of the radiator assembly 85.

In the illustrated example, the rotation axis 89 of the rotary connection mechanism is perpendicular to a further rotation axis 90 of the at least one movable door 88. Thereby, a compact design of the radiator assembly 85 can be provided for.

When the at least one movable door 88 comprises two doors, the rotation axis 89 of the rotary connection mechanism 99 may be perpendicular to both rotation axis of the two doors.

In some implementations, the rotation axis 89 of the rotary connection mechanism 99 is offset away from an edge 91 (here, the rearward edge of the door 88) of the at least one movable door 88 and offset away from the opening 87. Thereby, the doors 88 can be fully closed—e.g., in front of the support beam 93—when the radiator assembly 85 is in the first position 201.

In some embodiments, one or more cutouts 92 (indicated with the dotted line in FIG. 9) are located in the upper roof of the housing 86. The one or more cutouts 92 are offset away from the opening 87 and aligned with one or more support beams 93 of the radiator assembly 85. The one or more cutouts 92 further comprises guidance features—e.g., guide slots, grooves, guide pins, or the like—to receive a removable cover 94. The removable cover 94 is configured to embrace the one or more support beams 93 when the radiator assembly 85 is in the first position. There is a cutout 92 for each one the support beams 93. The radiator assembly 85 may comprise two support beams 93 symmetrically located at two opposite sides of the radiator assembly 85. Thereby, the interior of the housing 86 of the nacelle 83 can be sealed against the outside.

Referring back to FIG. 2 and FIG. 3, in some embodiments, the radiator assembly 85 comprises at least one foldable stiffening beam 95 rotatably mounted on the top of the radiator assembly 85. Each of the at least one foldable stiffening beam 95 can be moved between a third position and a fourth position. When the radiator assembly 85 is in the first position, the at least one foldable stiffening beam 95 is in the third position in which each of the at least one foldable stiffening beam 95 and the corresponding support beam 93 form an angle less than 90 degrees, less than 45 degrees. When moving the radiator assembly 85 or containing the radiator assembly 85 inside the nacelle 83, each of the at least one foldable stiffening beam 95 is in the fourth position in which each of the at least one foldable stiffening beam 95 is parallel with the corresponding support beam 93.

In various embodiments, as mentioned above, the cooling system further comprises a fluid flow path for a heat transfer fluid. In some examples, the fluid flow path may be formed by flexible tubes that can be disconnected and connected to the respective parts. Alternatively or additionally, the fluid flow path may be formed by fixed pipes; here, a rotary seal is arranged in between a first part of the fluid flow path and a second part of the fluid flow path. The rotary seal could be arranged at the hinge at the bottom of the support beam 93. The rotary seal could implement a hinge mounting the radiator assembly 85. The first part of the fluid flow path moves with the radiator assembly 85 when moving between the first position and the second position. The second part of the fluid flow path is fixed with respect to the at least one heat source. Such a fixed fluid flow path with rotary seal has the advantage that it may not be required to connect and disconnect flexible tubes during transportation. Further, the heat transfer fluid can be pre-filled into the fluid flow path, e.g., in a factory. It can remain in the fluid flow path during transportation.

The cooling system mentioned above comprising the radiator assembly 85 rotatably connected with the housing 86 of the nacelle 83 such that the radiator assembly 85 can be contained inside the nacelle 83 when transporting on roads. Thus, the total height of the radiator assembly 85 and the nacelle 83 is reduced to meet the normative dimensions, and the radiator assembly 85 and the nacelle can be transported together. Thus, extra transportation of the radiator assembly 85 and additional reassembling works at the deployment site can be avoided. Additionally, dust can be prevented from entering the radiator assembly 85 during transportation of the radiator assembly 85, as the radiator assembly is contained inside the nacelle 83 and covered by the at least one movable door 88.

FIG. 7 schematically illustrates aspects with respect to a method 100 for testing the above-mentioned cooling system for the wind turbine 80.

At step 101, the nacelle 83 is installed together with the radiator assembly 85 in a nacelle assembly factory such that the radiator assembly 85 is in the first position in which the radiator assembly 85 extends away from the housing 86 of the nacelle 83.

At step 102, a heat dissipation check of the cooling system is performed when the radiator assembly 85 is in the first position. This can include, e.g., circulating the heat transfer fluid in the fluid flow path. This can include, e.g., activating one or more heat sources. Testing can be conducted to check whether sufficient cooling power is provided.

At step 103, the radiator assembly 85 is moved to the second position in which the radiator assembly 85 is contained in the nacelle 83.

At step 104, the nacelle 83 containing the radiator assembly 85 is transported to a deployment site of the wind turbine 80 when the radiator assembly 85 is in the second position.

At step 105, the radiator assembly is moved back to the first position at the deployment site.

In some implementations, the heat dissipation check comprises checking circulation of a heat transfer fluid in a fluid flow path of the cooling system, the fluid flow path comprising a first part moving with the radiator assembly 85 when moving the radiator assembly 85 between the first position and the second position, and a second part fixed with respect to the at least one heat source. The heat transfer fluid can be filled into the fluid flow path as part of step 102 and may be retained in the sealed-off fluid flow path during step 103 and 104. Then, the radiator assembly is ready-to-use after step 105, without requiring the heat transfer fluid to be re-filled into the fluid flow path. This simplifies the setup.

Summarizing, a cooling system for a wind turbine has been described. The cooling system comprises a radiator assembly rotatably connected with a housing of the nacelle of the wind turbine such that the radiator assembly can be contained inside the nacelle when transporting on roads, thereby avoiding extra transportation of the radiator assembly, additional reassembling works at the deployment site, and flying of dust into the radiator assembly during transportation of the radiator assembly.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A cooling system for a wind turbine, comprising:
a radiator assembly; and
a nacelle comprising a housing rotatably connected with the radiator assembly;
wherein the cooling system is configured to thermally couple the radiator assembly to a heat source inside the nacelle;
wherein the radiator assembly is moveable between a first position and a second position about a rotation axis located inside the housing of the nacelle;
wherein, when in the first position, the radiator assembly extends away from an upper roof of the housing of the nacelle;
wherein, when in the second position, the radiator assembly is contained inside the housing of the nacelle.

2. The cooling system of claim 1, wherein the upper roof of the housing comprises an opening such that the radiator assembly is movable from the first position into the nacelle via the opening, towards the second position, and the upper roof of the housing comprises at least one movable door to open or close the opening of the upper roof of the housing.

3. The cooling system of claim 1, further comprising: a rotary connection mechanism configured to move the radiator assembly between the first position and the second position by rotation around a rotation axis.

4. The cooling system of claim 3, wherein the rotation axis of the rotary connection mechanism is perpendicular to a further rotation axis of the at least one movable door.

5. The cooling system of claim 2, wherein the rotation axis of the rotary connection mechanism is offset away from an edge of the at least one movable door and offset away from the opening.

6. The cooling system of claim 5, further comprising:
one or more cutouts in the upper roof offset away from the opening and aligned with one or more support beams of the radiator assembly and comprising guidance features to receive a removable cover configured to embrace the one or more support beams when the radiator assembly is in the first position.

7. The cooling system of claim 1, wherein the radiator assembly comprises at least one foldable stiffening beam rotatably mounted on a top of the radiator assembly.

8. The cooling system of claim 1, further comprising:
a fluid flow path for a heat transfer fluid; and
a rotary seal arranged in between a first part of the fluid flow path and a second part of the fluid flow path, wherein the first part of the fluid flow path moves with the radiator assembly when moving between the first position and the second position, and wherein the second part of the fluid flow path is fixed with respect to the heat source.

9. The cooling system of claim 8, wherein the radiator assembly is mounted in the nacelle via the rotary seal implementing a hinge configured to move the radiator assembly between the first position and the second position.

10. A wind turbine comprising the cooling system of claim 1.

11. A method for testing a cooling system of a wind turbine, wherein the cooling system comprises a nacelle of the wind turbine and a radiator assembly rotatably connected with a housing of the radiator assembly, wherein the radiator assembly is thermally coupled to a heat source inside the nacelle and moveable between a first position and a second position, the method comprising:
installing the nacelle together with the radiator assembly in a nacelle assembly factory such that the radiator assembly is in the first position in which the radiator assembly extends away from the housing of the nacelle;
performing a heat dissipation check of the cooling system when the radiator assembly is in the first position;
moving the radiator assembly to the second position in which the radiator assembly is contained in the nacelle;
transporting the nacelle containing the radiator assembly to a deployment site of the wind turbine when the radiator assembly is in the second position; and
at the deployment site, moving the radiator assembly back to the first position;
wherein the radiator assembly is moveable between the first position and the second position about a rotation axis located inside the housing of the nacelle.

12. The method of claim 11, wherein the heat dissipation check comprises checking circulation of a heat transfer fluid in a fluid flow path of the cooling system, the fluid flow path comprising a first part moving with the radiator assembly when moving the radiator assembly between the first position and the second position, and a second part fixed with respect to the heat source.

* * * * *